United States Patent [19]
Tsukamoto
[11] 4,179,589
[45] Dec. 18, 1979

[54] PHONO CARTRIDGE

[76] Inventor: Kenkichi Tsukamoto, 47, Koyamashimofusa-cho, Kita-ku Kyoto-shi, Kyoto-fu, Japan

[21] Appl. No.: 905,351
[22] Filed: May 12, 1978

Related U.S. Application Data

[63] Continuation-in-part of Ser. No. 704,803, Jul. 13, 1976, abandoned.

[51] Int. Cl.² ........................ H04R 11/08; G11B 3/02
[52] U.S. Cl. .............................. 179/100.41 D; 274/37
[58] Field of Search .................................. 274/37, 38; 179/100.41 K D

[56] References Cited

U.S. PATENT DOCUMENTS

| | | | |
|---|---|---|---|
| Re. 25,597 | 6/1964 | Dieter | 179/100.41 K |
| 3,062,925 | 11/1962 | Pritchard | 179/100.41 K |
| 3,184,555 | 5/1965 | Marshall | 179/100.41 K |
| 3,299,219 | 1/1967 | Madsen | 179/100.41 K |
| 3,495,838 | 2/1970 | Zimmermann | 274/37 |
| 3,731,009 | 5/1973 | Watanabe et al. | 179/100.41 K |
| 3,956,598 | 5/1976 | Kawakami et al. | 274/37 |

FOREIGN PATENT DOCUMENTS

| | | | |
|---|---|---|---|
| 1000035 | 8/1965 | United Kingdom | 179/100.41 K |

*Primary Examiner*—John W. Shepperd
*Attorney, Agent, or Firm*—George B. Oujevolk

[57] ABSTRACT

A phono cartridge having a straight cantilever is supported on or upper the corner edge thereof by a suspension wire means limiting the motion in a direction along the cantilever axis and a leaf spring means limiting the motion around the cantilever axis arranged in a manner that the action line is substantially coincident with the gravity center thereof and the mass around the action line is in balance.

2 Claims, 15 Drawing Figures

PHONO CARTRIDGE

BACKGROUND OF THE INVENTION

This is a continuation-in-part of application Ser. No. 704,803 filed July 13, 1976 now abandoned.

This invention relates to phonograph cartridges for translating stylus motion into electrical energy, and more particularly to the improvement of cantilevers.

The term "vibration signal," as used herein, is intended to mean a mechanical vibration bearing certain information.

Rotation of cantilever in phono cartridge is undesirable because it changes a so-called "cross-talk characteristic" for the worse and makes it impossible to have reproduction in high quality. Heretofore, in order to improve the cross-talk characteristic a cantilever 10 such as shown in FIG. 1, has been provided which is bent at its middle portion 10*c* in order to adjust its vertical tracking angle and is provided with a stylus tip 12 fixed to its free end 10*a*, and which is supported at the other end 10*b* by a suspension wire 11. In this conventional cantilever 10, an action line 13 obtained by connecting the tip top of the stylus tip 12 and the fulcrum formed by the suspension wire 11 is made to be almost coincident with the gravitational center G of cantilever 10 in order to improve the mass balance for the rotation.

However, in a cantilever of this type, the mass with respect to the bent portion is unavoidably obstructive to the establishment of mass balance around the action line 13, and therefore the mass balance around the action line is limited to some extent. From the above two requirements arise for improving the cross-talk characteristic, i.e. (i) the action line should pass through the center of gravity of the cantilever, and (ii) the cantilever should not be bent.

Furthermore, at a relatively low frequency the cantilever 10 is vibrated as shown in FIG. 2(a), that is, it seems that the point a is the vibration fulcrum; however, at a relatively high frequency its vibration becomes intricate as shown in FIG. 2(b). In the latter case, the cantilever's vibration is not controlled at one point, that is, it is liable to turn around the action line 13, as a result of which appreciable cross-talks are induced.

A cantilever 40, as shown in FIG. 3, is known in the art, which is supported by a suspension wire 42 and a leaf spring 43 (FIG. 4). In this conventional cantilever 40, the suspension wire 42 serves to limit the motion of the cantilever 40 in the direction of the action line 45, and the leaf spring 43 serves to limit the rotational motion of the cantilever around the action line 45, and the fulcrum is provided at one point on the center axis 41 of the cantilever 40. Thus, the cross-talk characteristic of this cantilever is better than that of the cantilever shown in FIG. 1.

However, the center of gravity G (being at a point close to the central axis 41 of the cantilever 40, as shown in the drawing) of the cantilever 40 including the stylus tip 44 is greatly apart from the action line 45. Accordingly, the mass balance around the action line 45 is not considered at all. For this reason, it is impossible to limit the rotation around the action line to less than a certain degree, and accordingly improvement of the cross-talk characteristic is also limited to a certain extent.

SUMMARY OF THE INVENTION

Accordingly, a primary object of this invention is to overcome all of the above-described difficulties accompanying conventional phono cartridges.

More specifically, a primary object of the invention is to provide a phono cartridge having a cross-talk characteristic improved over a wide frequency range.

Another object of the invention is to provide a phono cartridge the manufacturing efficiency of which is improved.

The foregoing objects and other objects of this invention have been achieved by the provision of a straight cantilever supported at one point by suspension wire means limiting the motion in a direction along the cantilever axis and leaf spring means limiting its motion around the cantilever axis, in which the suspension wire means and leaf spring means are arranged in such a manner that the action line forming by connecting the tip at the top of the stylus and the fulcrum of the cantilever coincident with the gravity center of the cantilever and the mass around the action line is in balance.

The principle, nature and utility of this invention will become more apparent from the following detailed description and the appended claims when read in conjunction with the accompanying drawing.

DETAILED DESCRIPTION OF THE INVENTION

It shall be understood that the term "a cantilever" as used herein includes a stylus tip connected thereto in the case when the center of gravity is referred to.

Figure 5:
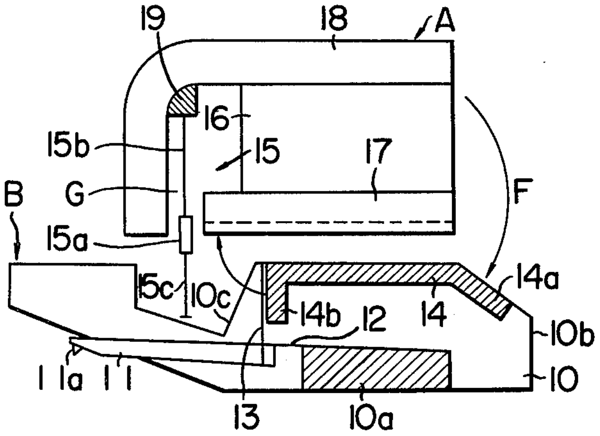
FIG. 5 is an elevational view (with parts sectioned) showing one example of a moving coil cartridge according to this invention.

One preferred embodiment of a moving coil cartridge according to this invention, as shown in FIG. 5, comprises a generator section A for translating stylus motion into electrical energy, and a vibrator section B for providing the stylus motion. These means A and B are fixed to a cartridge casing (not shown in FIG. 5).

Figure 6:
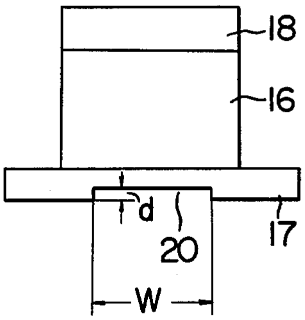
FIG. 6 is a side elevation showing supporting a magnet member of the moving coil cartridge shown in FIG. 5.

The generator section A comprises a magnet 16, and yokes 17 and 18 which form an air gap G therebetween. Into the air gap G a moving coil 15*a* of an armature 15 in the vibrator section B is inserted. The yoke 17, as shown in FIG. 6 has a recess 20 d deep and W wide extended in the longitudinal direction.

Figure 7:
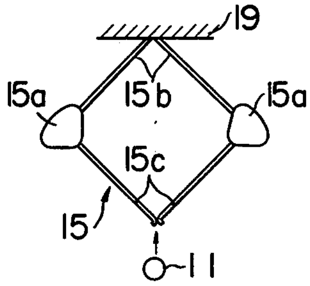
FIG. 7 is a diagram showing an armature employed in the moving coil cartridge.

The armature 15 is connected to a non-magnetic block 19 provided in the generator section A. More specifically, the armature, as illustrated in FIG. 7, is an elastic member in the form of a pantograph which is connected to the block 19 (which may be fixed to the yoke 18 of the magnet or it may be formed as a part of the cartridge body) at one end. An end of the elastic member opposite to the fixed end is adapted to engage a straight cantilever 11 as described below. Two moving coils 15*a* are provided at the intersections of the upper arms 15*b* and the lower arms 15*c* of the pantograph-shaped elastic member, respectively.

On the other hand, the vibrator section B, as shown in FIG. 5, comprises the straight cantilever 11 having a stylus tip 11*a* fixedly connected thereto, a suspension wire means 12, and a leaf spring means 13. The suspension wire means 12 and the leaf spring means 13, as described later, are fixedly accommodated in a stylus holder case 10 to support the straight cantilever 11.

The stylus holder case 10 has a magnetic member 14 such as an iron piece or a magnet at its portion confronting the yoke 17. Therefore, the base 10 is attracted and fixed to the magnet 16 by the action of the magnetic flux of the magnet. The magnetic member 14 has bent portions 14*a* and 14*b* so that its sectional area passed by the flux is increased and the attractive force is increased.

Figure 1:
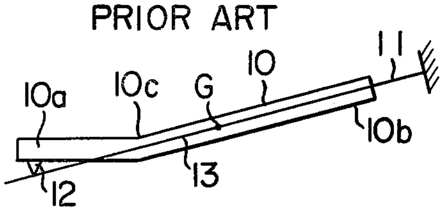
FIG. 1 PRIOR ART
FIG. 1 is a schematic side view illustrating a conventional cantilever.
Figure 2A:
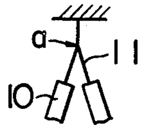
FIG. 2a PRIOR ART
FIGS. 2*a* and 2*b* are explanatory diagrams for describing the vibration of conventional cantilevers.
Figure 2B:
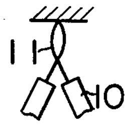
FIG. 2b PRIOR ART

The width (measured in a direction perpendicular to the drawing sheet of FIG. 5) of the case 10 is slightly smaller than the width W of the recess 20 in the yoke 17 (FIG. 2) so that the base 10 can be fitted into the recess 20. In other words, alignment in a lateral direction of the generator section and the vibrator section is obtained by inserting the base 10 into the recess 20 provided in the yoke 17.

Figure 8:
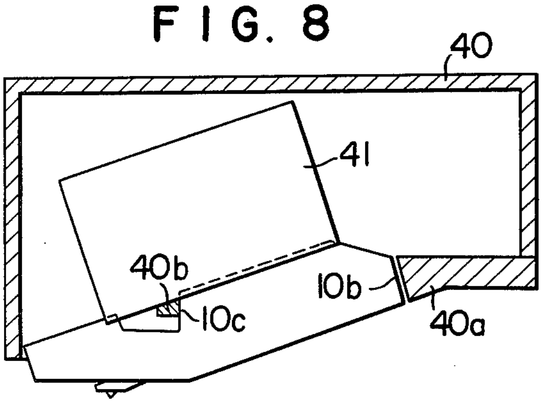
FIG. 8 is a sectional view illustrating the engagement of a cartridge casing and a stylus holder case according to the invention.

On the other hand, alignment in a longitudinal direction of these sections is achieved by abutting two surfaces 10*b* and 10*c* of the case 10 against retaining members or blocks 40*a* and 40*b* of the cartridge casing 40 as is shown in FIG. 8. More specifically, a part (including the magnetic member 14) of the vibrator system B is in the form of a wedge having the surfaces 10*b* and 10*c*, and this wedge-shaped part is fitted into the space defined by the blocks 40*a* and 40*b* of the casing 40.

In FIG. 8, the magnet and yokes are generally indicated by reference numeral 41.

The stylus holder case 10, and accordingly the vibrator section B thus positioned will not be moved in any direction with respect to the generator section A.

The magnet 16 of the moving coil cartridge has attractive force strong enough to attract and fix the stylus holder case 10 to which a stylus pressure (generally not more than 3 grams) is applied. The two surfaces 10*b* and 10*c* forming the wedge-shaped part of the case 10 is useful to positively fix the case to the cartridge casing 40.

Attracting the stylus holder case 10 to the magnet 16 from below allows the case 10 to positively fix to the cartridge, and simultaneously the cantilever 11 supported on the case 10 to engage the lower arms 15*c* of the armature 15 at the intersection thereof (FIG. 7). Thus, the cartridge assembling work is completed.

The engagement of the cantilever with the armature is achieved in such a manner that those two elements are supported by each other through their elasticity. Therefore, no additional means is necessary for this engagement, and the two elements can be readily engaged together or disengaged from each other.

If briefly summarized, in this invention the stylus holder case 10, the yoke 17, and the cartridge casing are suitably devised so that the case 10 can be readily and positively engaged with and disengaged from the cartridge casing.

Constructions of the straight cantilever 11, and fixing the cantilever 11 to the stylus holder case 10 will now be described.

Figure 3:
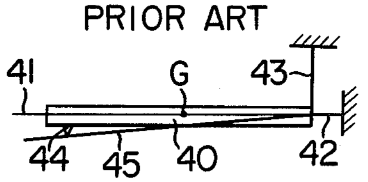
FIG. 3 PRIOR ART
FIG. 3 is a schematic diagram illustrating a conventional method of supporting a cantilever.
Figure 4:
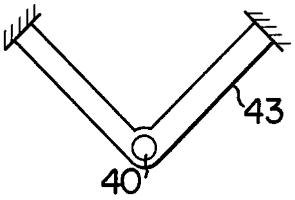
FIG. 4 PRIOR ART
FIG. 4 is an elevational view showing one of the supporting means employed in the cantilever supporting method illustrated in FIG. 3.

One example of a straight cantilever according to this invention, as shown in FIG. 9, comprises supporting means similar to those in FIG. 3. More specifically, the cantilever 90 having a stylus tip 11*a* is supported by a suspension wire means 12 and a leaf spring means 13 combined each other at the connection point (i.e. fulcrum point) 90 as shown in FIG. 9. And this combination or the definition of the fulcrum 90 is made in the manner that the action line 11*b* obtained by connecting the tip at the top of the stylus 11*a* and the fulcrum 90 is coincident with the gravitation center G which is on or very near to the center axis 11*c* of the cantilever 11.

Figure 9A:
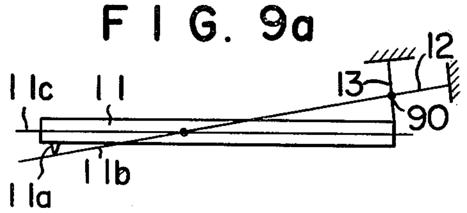
FIGS. 9*a*, 9*b*, 9*c* are schematic side views illustrating examples of the cantilever according to this invention.
Figure 9B:
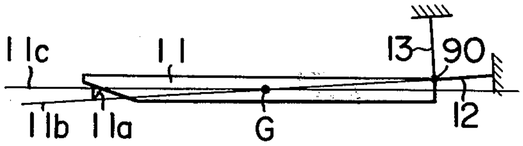
Figure 9C:
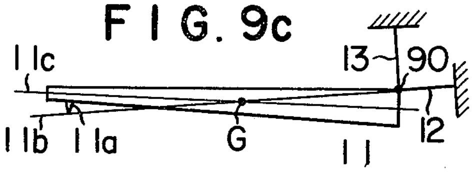
Figure 10:
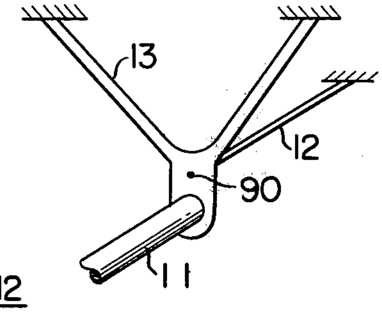
FIG. 10 is a perspective view showing one modification of the cantilever according to the invention.

Also, according to this invention, the cantilever 11 can be straight, because the fulcrum 90 is made on or upper the edge of the cantilever by the combination of the suspention wire means 12 and the leaf spring means 13, and without bending the action line 11*b* is easily coincident with the gravitational center. Therefore, FIG. 9*a* shows a basic relations of the straight cantilever and the support constructions (partial view of this construction is shown in FIG. 10). Actually when the vertical tracking angle is adjusted, the one end portion of the cantilever 11 may be simply shaven (FIG. 9*b*) or the cantilever 11 as a whole may be made tapered (FIG. 9*c*).

For these kinds of shape of the cantilever, bending (if bent) or shaving quantity in order to adjust its vertical tracking angle could be relatively small, and the manufacturing of the cantilever becomes easy, according to this invention. Also, the mass balance around the action line 11*b* can be established more easily and precisely, and therefore the cross-talk characteristic is highly improved.

It has been described above that the cantilever 11 is fixedly mounted on the case by means of the suspension wire means 12 and the leaf spring means 13.

Figure 11:
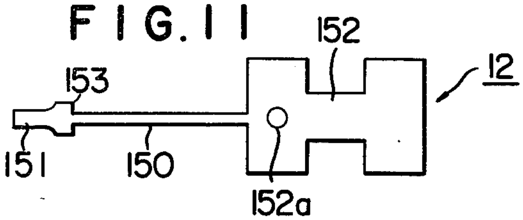
FIGS. 11 and 12 are explanatory diagrams for a description of cantilever supporting means.

The suspension wire means 12, as shown in FIG. 11, consists of: an elongated portion 150 for substantially suspending the cantilever 11; a cantilever receiving portion 151 provided at one end of the elongated portion 150; and a fixing portion 152 for fixing the wire means 12 to a fixing block 10*a* (FIG. 5) provided in the case 10. The shape of fixing portion 155 is made complementary with that of a recess (not shown) provided in the block 10*a*. The suspension wire means 12 is fixedly connected to the case 10 by fixing the fixing portion 152 to the recess of the block 10*a* with adhesive. The fixing portion 152 has a through-hole 152*a* through which the adhesive applied for cementing the fixing portion to the block 10*a* is extruded over the surface of fixing portion 152. Thus, the provision of the holes 152*a* has an effect equivalent to that which is obtained by fixing the wire means 12 with a river or a screw.

Figure 12:
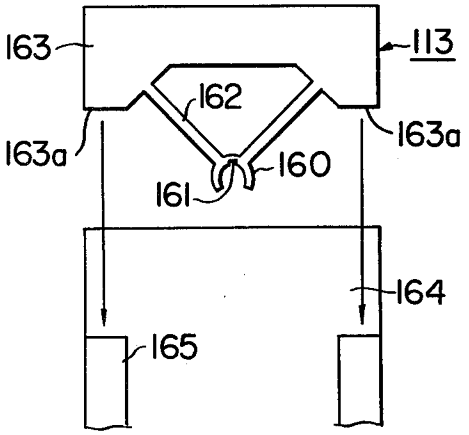

The leaf spring means 13, as illustrated in FIG. 12, consists of: a cantilever holding portion 160; two elongated elastic portions 162 connected to the cantilever holding portion 160 and forming approximately 90 degrees with each other; and a fixing portion 163 connected to the two elongated elastic portions 162, for fixing the leaf spring means 13 to the frame of the stylus holder case 10.

The cantilever holding portion 160 of the leaf spring means 13 is in the form of an open ring having a gap through which the cantilever 11 is inserted into the open ring. At the top part of the ring-shaped portion 160 along the symmetry axis of the leaf spring means 13 there is provided a recess 161.

The elongated portion 150 of the suspension wire means 12 is inserted into this recess 161 of the leaf spring means 13 in such a manner that an abutting end 153 of the suspension wire means 12 is abutted against the leaf spring means 13. The cantilever, the suspension wire means, and the leaf spring means are fixed together with adhesive applied to the cantilever receiving portion 151 and the abutting portion 153.

The leaf spring means 13 is inserted from above into a gap 164 provided in the stylus holder base 10 until edges 163*a* of the spring 13 reach the shoulders of a block 165 provided in the case 10 to determine the vertical position of the leaf spring means 13. Thereafter, the leaf spring means 13 is fixed to the base by inserting an auxiliary thin plate (not shown) between the leaf spring means 13 and the wall of the gap 164.

With respect to mounting the cantilever 11 on the stylus holder case 10, the concerned parts are formed complementary in shape with each other, which facilitates the assembling of the cartridge.

As is apparent from the above description, according to this invention the stylus holder case with the cantilever, or the vibrator section can be detachably coupled to the generator section with the aid of the magnetic force of the magnet originally provided in the generator section. Accordingly, the moving coil cartridge according to the invention is advantageous in that the replacement of the stylus can be readily and positively achieved, and the assembling of the cartridge is simple, as a result of which the cartridge manufacturing efficiency is remarkably improved.

Although the above embodiments relate to moving coil type cartridges, this invention can be applicable also for moving magnet type cartridges, moving iron type cartridges as well as the other type of cartridges. Also, a latitude of modification, change and substitution are intended in the foregoing disclosure and in some instances some features of the invention will be employed without a corresponding use of other features. Accordingly it is appropriate that the appended claim be construed broadly and in a manner consistent with the spirit and scope of the invention herein.

What is claimed is:

1. A phono-cartridge comprising a casing, a magnet mounted in the casing, a coil disposed to receive the magnetic flux of the magnet, a straight cantilever having a stylus tip on one end thereof for picking up information stored in grooves of a recorded disk, the magnet and the coil being driven relative to each other by the motions of the cantilever, the cantilever being supported by a suspension wire means limiting the motion in a direction along the cantilever axis and a leaf spring means limiting the motion around the cantilever axis, the suspension wire means engaging the leaf spring means to form a fulcrum on or above the cantilever at about a 90 degree angle, the action line formed by connecting the top of the stylus tip and the fulcrum made by the suspension wire means and the leaf spring means being coincident with the gravitational center of the cantilever.

2. A phono-cartridge comprising:

(a) a casing;

(b) a magnet (16) mounted in the casing;

(c) a coil disposed to receive magnetic flux from the magnet;

(d) an elongated straight cantilever (11) having a stylus with a tip (11*a*) at one end thereof, disposed for picking up information stored in grooves of a recorded disk, said magnet and coil being driven relative to each other by means of the movement of said cantilever (11); and, (e) suspension wire means (12) cooperating with a leaf spring (13) towards said cantilever other end, said suspension wire means being so disposed as to limit the motion of the cantilever along the cantilever longitudinal axis, said leaf spring (13) being disposed substantially at 90 degrees to the plane of said suspension wire means for limiting motion around the cantilever axis, said leaf spring and said suspension wire means forming a fulcrum (90) on or above the cantilever, said stylus tip (11*a*) at the one end and said fulcrum (90) towards said other end serving as points which define an imaginary action line which passes through and coincides with the gravitational center of the cantilever.

* * * * *